United States Patent
Vulkan et al.

(10) Patent No.: US 8,376,180 B2
(45) Date of Patent: Feb. 19, 2013

(54) VENTING TUBING SYSTEM FOR A FUEL TANK

(75) Inventors: Omer Vulkan, D.N. Hanegev (IL); Moshe Ehrman, D.n. Halutza (IL)

(73) Assignee: Raval A.C.S. Ltd., Beer-Sheva (IL)

( * ) Notice: Subject to any disclaimer, the term of this patent is extended or adjusted under 35 U.S.C. 154(b) by 722 days.

(21) Appl. No.: 12/309,115

(22) PCT Filed: May 31, 2007

(86) PCT No.: PCT/IL2007/000658
§ 371 (c)(1),
(2), (4) Date: Jan. 21, 2009

(87) PCT Pub. No.: WO2008/007352
PCT Pub. Date: Jan. 17, 2008

(65) Prior Publication Data
US 2009/0321461 A1    Dec. 31, 2009

Related U.S. Application Data

(60) Provisional application No. 60/830,105, filed on Jul. 12, 2006.

(51) Int. Cl.
*B60K 15/035* (2006.01)
(52) U.S. Cl. .................................. 220/746; 220/562
(58) Field of Classification Search .......... 220/746, 220/745, 661, 89.1, 203.29, 203.27, 203.23, 220/203.2, 203.19, 203.01, 601, 202, 563, 220/694, 200; 138/39, 37, 106, 103; 206/0.6; *B60K 15/035*
See application file for complete search history.

(56) References Cited

U.S. PATENT DOCUMENTS

| | | | | | |
|---|---|---|---|---|---|
| 1,779,786 | A | * | 10/1930 | De Alzaga Unzue | 220/562 |
| 3,542,239 | A | * | 11/1970 | Seiden et al. | 220/746 |
| 3,672,537 | A | * | 6/1972 | Kitzner | 220/746 |
| 3,687,335 | A | * | 8/1972 | Hunter | 220/746 |
| 4,261,477 | A | | 4/1981 | Casimir et al. | |
| 4,483,454 | A | * | 11/1984 | Rogers et al. | 220/562 |
| 4,742,840 | A | | 5/1988 | Takahashi et al. | |
| 5,215,135 | A | * | 6/1993 | Coakley et al. | 144/365 |
| 5,454,222 | A | | 10/1995 | Dev | |
| 5,829,619 | A | * | 11/1998 | Gupta et al. | 220/86.2 |
| 6,779,544 | B2 | | 8/2004 | Devall | |

(Continued)

FOREIGN PATENT DOCUMENTS

| | | |
|---|---|---|
| DE | 29 12214 C2 | 10/1980 |
| DE | 199 56 931 A1 | 5/2001 |
| DE | 199 56 582 C2 | 6/2001 |
| DE | 100 63 389 A1 | 6/2002 |
| EP | 1 495 897 A1 | 1/2005 |

(Continued)

OTHER PUBLICATIONS

Supplementary European Search Report, EP 07 73 6398, completed on Apr. 13, 2011, 2 pages.

*Primary Examiner* — Mickey Yu
*Assistant Examiner* — Robert J Hicks
(74) *Attorney, Agent, or Firm* — Vorys, Sater, Seymour and Pease LLP; Susanne M. Hopkins; William L. Klima

(57) ABSTRACT

A fuel tank comprising at least one fuel vapor accessory articulately coupled with a fuel tubing extending within the fuel tank. The tubing extends from a field end of the tank towards an outlet end thereof, and is formed with at least one aperture between the field end and the outlet end. The fuel vapor accessory is disposed between the field end and the outlet end. The tubing is secured to an inside upper wall of the fuel tank.

18 Claims, 6 Drawing Sheets

U.S. PATENT DOCUMENTS

| | | | |
|---|---|---|---|
| 2001/0035421 A1* | 11/2001 | Essing | 220/746 |
| 2002/0020487 A1* | 2/2002 | Vorenkamp et al. | 156/244.19 |
| 2002/0083974 A1 | 7/2002 | Duermeier et al. | |
| 2002/0121300 A1* | 9/2002 | Ehrman et al. | 137/202 |
| 2002/0121301 A1* | 9/2002 | Devall | 137/202 |
| 2003/0205272 A1* | 11/2003 | Benjey et al. | 137/202 |
| 2005/0155654 A1* | 7/2005 | Vulkan et al. | 137/587 |
| 2005/0172999 A1* | 8/2005 | Ohshiro et al. | 137/202 |

FOREIGN PATENT DOCUMENTS

| | | |
|---|---|---|
| JP | 52-58233 A | 5/1977 |
| JP | 2000-120494 A | 4/2000 |
| JP | 2001-178284 A | 7/2001 |
| JP | 2002-317708 A | 10/2002 |
| JP | 2005-225254 A | 8/2005 |
| WO | 01/30601 A1 | 5/2001 |

* cited by examiner

VENTING TUBING SYSTEM FOR A FUEL TANK

This application was filed under 35 U.S.C. 371 as a national stage of PCT/IL2007/000658, filed May 31, 2007, an application claiming the benefit under 35 USC 119(e) Jul. 12, 2006, the entire content of which is hereby incorporated by reference in its entirety.

FIELD OF THE INVENTION

This invention generally relates to venting systems for vehicle fuel tanks and more particularly it is concerned with a venting tubing system for vehicle fuel tanks.

BACKGROUND OF THE INVENTION

Vehicle fuel systems comprise, among others, a fuel tank fitted with a filler neck, a variety of fuel valves, a tubing for supplying fuel to the ignition system and a fuel vapor treating system (typically a carbon filter recovery system often referred to as a carbon canister) to which fuel vapor from the fuel tank flows and is then used for enriching the fuel mixture fed to the ignition system.

Fuel fluid (in the form of liquid, droplets, spray and vapor) from the fuel tank flows via the one or more valves which are connected, via suitable tubing, to a liquid trap intermediate the fuel vapor recovery system and the tank.

The liquid trap receives fuel fluid flowing from the fuel tank which flow at a relatively high velocity owing to pressure and temperature changes, and thus vapor flowing from the fuel tank carries along with it also a considerable amount of fuel liquid in the form of droplets. The liquid trap entraps the fuel liquid and allows fuel vapor flow towards the vapor recovery system. The fuel liquid then returns back to the fuel tank, upon pressure decrease within the fuel tank.

An important factor in attaching accessories to a fuel tank is maintaining a fuel-impermeability so as to comply with strict environmental regulations. One common practice to connect a valve to a fuel tank is by performing an aperture of a size comfortably accommodating the valve's housing, and fixedly attaching the valve by various means, e.g. welding, heat welding, different fasteners, etc. However, according to these methods, there is a need to provide special sealing means between the valve's housing and the tank.

According to another technique fuel valves are attached to the fuel tank by fusion welding the valve to the inside upper surface of the fuel tank. Alternatively, a coupler element is securely attached to the upper surface of the fuel tank and the valve is fixed to said coupler element.

The external surface of a tank holding one or more valves also carries at least a portion of an outlet nozzle and tubing connected thereto, as well as, in some cases, also some electrical wiring. This requires special space design of the fuel tank, and other considerations.

Another consideration concerned with connection of valves to tanks is the effective operation level of the valves, namely the level at which the valve closes (at times referred to as cut-off or shut-off and the level at which the valve reopens. One of the considerations governing the operative level is space consuming which is of significant importance in particular in vehicles. It is thus a requirement that the "dead space" i.e. the space between "maximum fuel level" and the top wall of the fuel tank, be reduced to minimum. However, by inserting the valve into the tank, care has to be taken not to increase the dead space.

Another parameter of concern is the time required for assembling and attaching each individual fuel vapor accessory to the fuel tank and to the articulated coupling tubing, and the costs involved therewith.

The ever-growing requirement of environment concerned organizations and authorities that the rate of fuel permeability from the fuel tank and its accessories be minimal. The outcome of this requirement is that new connection means are now required for ensuring essentially permeation-free connection between the valves and the fuel tank.

It is thus a growing trend to form as little as possible openings in the tank (ideally only one), and accordingly a venting system with its associated valves and connections are relocated as far as possible into the tank.

It is an object of the present invention to provide a concept for attaching fuel vapor accessories within a fuel tank in a substantially fuel impermeable manner. It is a further object of the invention to provide a fuel-flow coupling system interconnecting the various fuel vapor accessories. These and other objects are carried out in a substantially fuel impermeable manner, which is considered to be substantially fast and cost effective.

SUMMARY OF THE INVENTION

According to the present invention there is provided a vehicle fuel vapor system comprising tubing interconnecting various fuel vapor accessories within a fuel tank, where the tubing is continues and where the fuel vapor accessories are integral with or snappingly articulated to the tubing.

The term 'fuel vapor accessory' as used herein the specification and claims is used to denote any of a variety of devices/fittings commonly attached within fuel tanks (i.e. fuel system components), such as valves of different types (vent valves, roll-over valves, over filling intermitting valves, over pressure relief valves, check valves, etc), liquid traps and drains, gauges, filters, etc. and also a seating/carrier attached to the fuel tank and which in turn various valve members are attached thereto. However the invention is not limited to any particular type of fuel vapor accessory.

The term tubing as used herein the specification and claims is used to denote any tubing/tubing interconnecting between fuel vapor accessories as aforementioned.

The continuously extending tubing according to any of the embodiments of the invention, saves time and expected expenses in assembling the fuel system within the fuel tank, as compared with conventional systems where a separate tube segment extends between each fuel vapor accessory.

The invention thus calls for a fuel tank comprising at least one fuel vapor accessory articulately coupled with a fuel tubing extending from the fuel tank, said tubing secured to an inside upper wall of the fuel tank.

Any one of the following features may apply to the present invention:

- The at least one fuel vapor accessory may be integrated within the tubing;
- The at least one fuel vapor accessory may be snap-coupled to the tubing;
- The tubing is a continuous tube interconnecting at least two fuel vapor accessories within said fuel tank;
- The continuous tube envelopes the at least one fuel vapor accessory, with functional openings formed at segments corresponding with said at least one fuel vapor accessory;
- The tubing extends between the at least one fuel vapor accessory and a common hub member;
- The tubing is made of a rigid though pliable material;

The tubing is pre-formed at a shape corresponding with a contour of the inside upper wall of the fuel tank, to which it is secured;

The tubing is secured to the fuel tank by snap-type fasteners;

Fluid flow through the tubing is facilitated through the tubing regardless the operative state of at least one fuel vapor accessory. Thus, the fuel vapor accessory occupies only a portion of the section through which it extends, leaving a free flow path;

The diameter of the tubing is substantially homogeneous.

The fuel vapor accessory axially extends within the tubing.

The fuel tank is typically fitted with a flange sealingly and impermeably receiving the outlet of the tubing for transfer of fuel vapor towards the canister.

The invention is further concerned with tubing and a fuel vapor accessory of the aforementioned type.

BRIEF DESCRIPTION OF THE DRAWINGS

In order to understand the invention and to see how it may be carried out in practice, some embodiments will now be described, by way of non-limiting examples only, with reference to the accompanying drawings, in which.

DETAILED DESCRIPTION OF EXEMPLARY EMBODIMENTS

Figure 1:
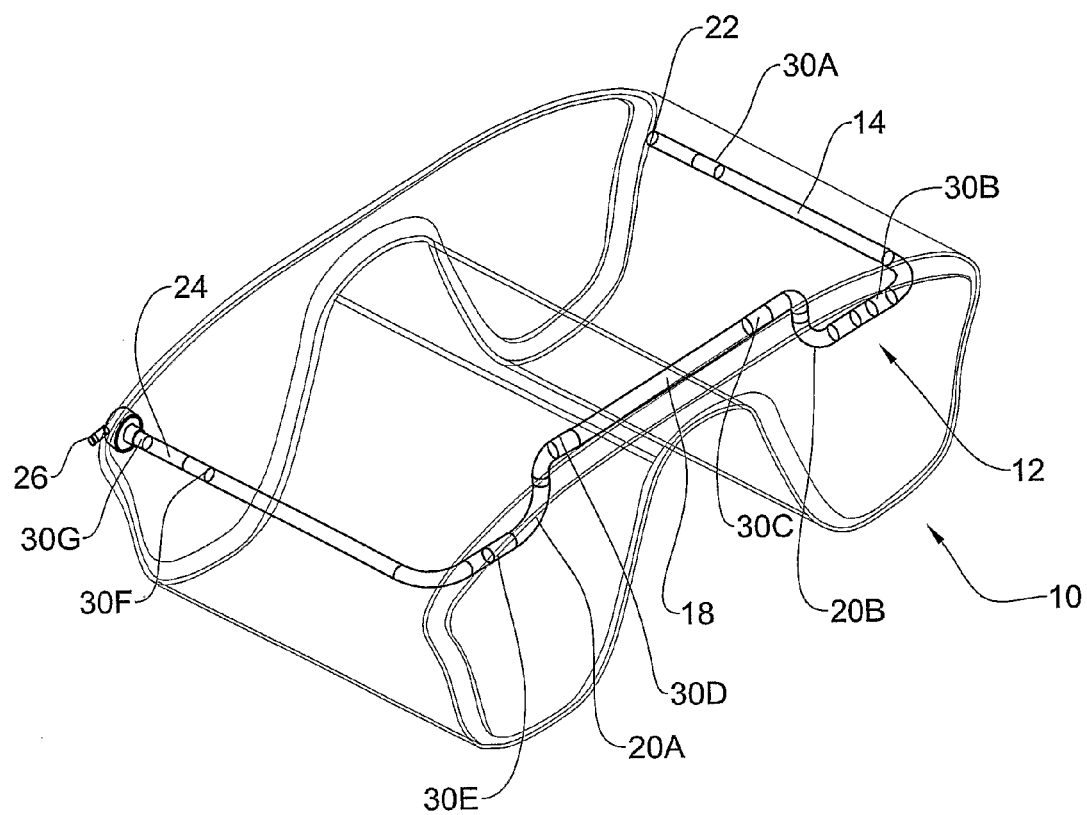
FIG. 1 is an isometric view of a fuel tank fitted with a fuel piping system in accordance with a first embodiment, the fuel tank being transparent for visualizing the tubing system.
Figure 2:
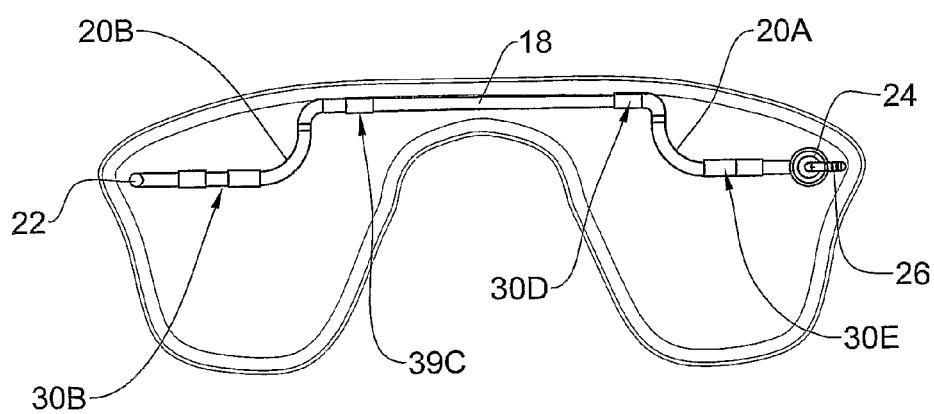
FIG. 2 is a rear view of the fuel tank of FIG. 1.
Figure 3:
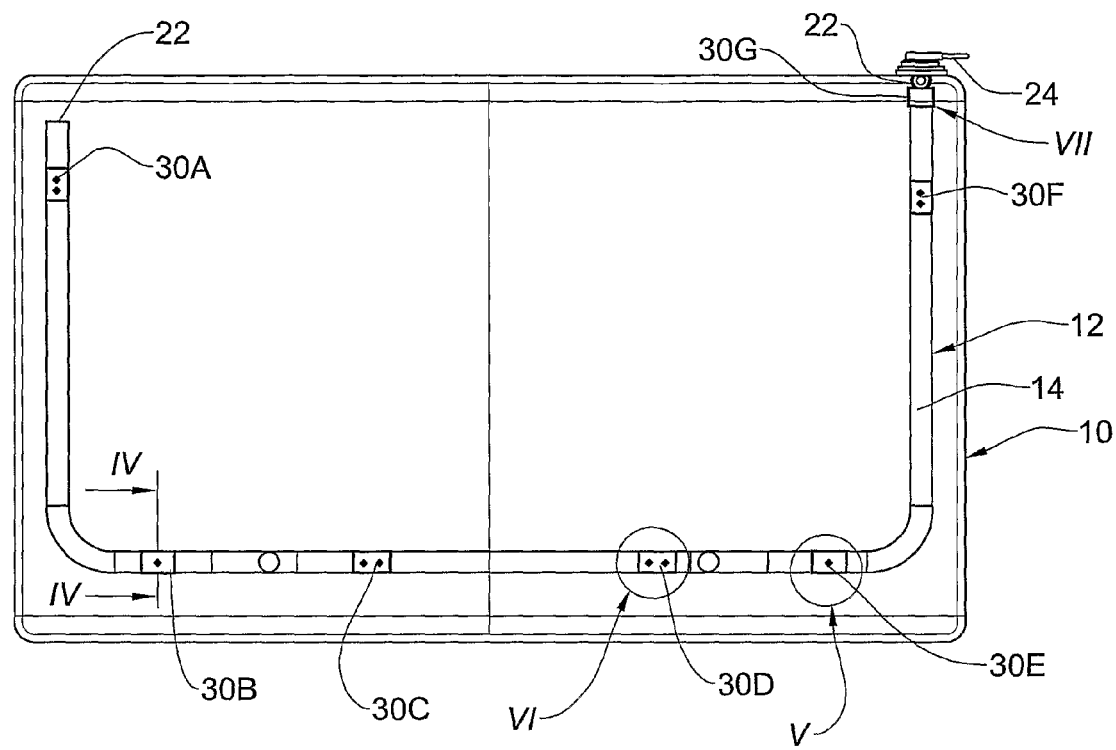
FIG. 3 is a bottom view of the fuel tank of FIG. 1.

Attention is first directed to FIGS. 1 to 3 illustrating a fuel tank generally designated 10 comprising a venting tubing system in accordance with the present invention generally designated 12. The fuel tank has a saddle or spectacle-like shape as known per se, suited for mounting within a vehicle as known in the art.

The venting tubing system 12 comprises a continuous tube 14 made of a rigid material e.g. plastic, which in accordance with an embodiment of the present invention may also be pliable or even resilient. The tubing 14 generally follows the shape of the fuel tank 10 formed with an uppermost portion 18 and two side lowermost portions 20A and 20B, interconnected by the continuous tubing, as mentioned hereinabove.

The tube 14 extends from a field end thereof 22 towards an outlet end thereof 24 extending into a outlet coupler 26 which in turn is connected via suitable tubing (not shown) to a fuel vapor treating system-canister (not shown) as known in the art.

The tubing 14 is integrally formed with a plurality of fuel vapor accessories generally designated 30A-30F. These fuel vapor accessories may be any one or more of different valves such as vent valves, rollover valves, overfilling intermitting valves, liquid traps, liquid drains, gauges, filters, etc. However more likely, the fuel vapor accessory designated 30G is a check valve (i.e. one-way flow valve) and one or both of the fuel vapor accessories designated 30E and 30B are liquid carry over drain valves (LCO). The fuel vapor accessories designated 30D and 30C are likely to be rollover valves and overfilling intermitting valves, as known in the art and for that purpose these valves are positioned at or adjacent to uppermost portions of the fuel tank 10.

As can be seen in the drawings, the tubing 14 is substantially of equal diameter though it may be somewhat thicker at those portions of the different fuel vapor accessories. It is noticed that the fuel vapor accessories axially extend within the tubing 14 and whereby the tubing envelopes the respective fuel vapor accessories, however leaving necessary apertures formed therein for operation of the valves, as required. A method of manufacturing tubing in accordance with the present invention is substantially similar to that known in the art in connection with inline drip irrigation wherein the drip units (liquid emitters) are integrated into the tubing during the process of manufacturing in a continuous extrusion process.

The diameter of the tubing in accordance with the present invention may be similar to existing tubing segments used nowadays for connecting between different valve accessories or may be slightly larger, as may be required.

The tubing 14 may be attached to the upper wall of the fuel tank 10 upper ends of side Walls thereof by different fastening means, however without the need to form any apertures in the fuel tank, apart from the outlets at 22. Securing the tubing 14 to the fuel tank may be for example by snap-type couplers generally designated 38 comprising a flange portion 40 for attaching to a respective wall portion of the fuel tank and a tube gripping portion 42 for snappingly arresting the tubing 14. Attaching the flanged portion 40 to the fuel tank 10 may be for example by using an adhesive agent, by heat welding, fusion welding, by snap type fasteners, etc.

Figure 4:
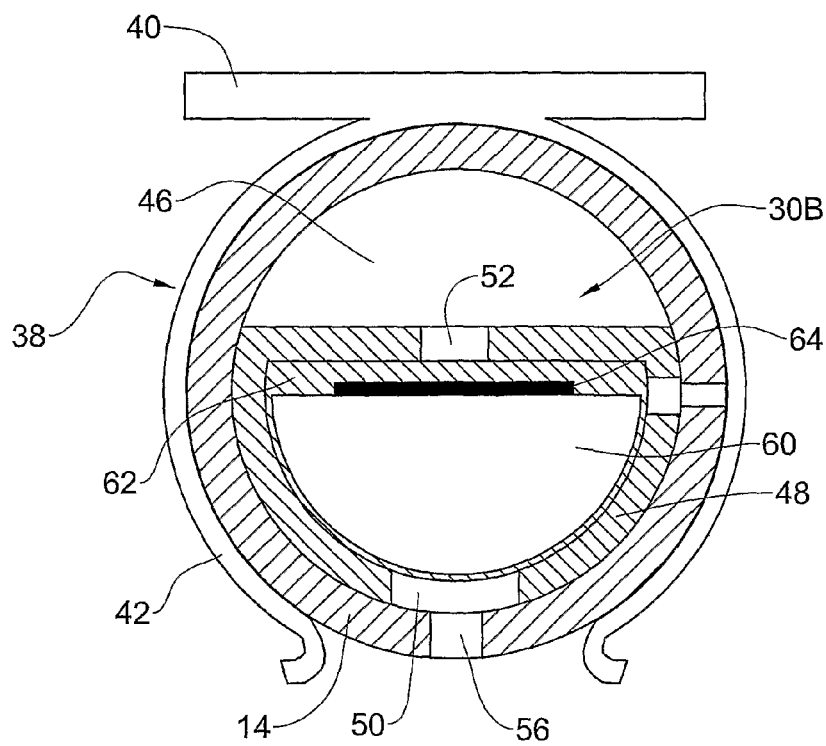
FIG. 4 is schematic section of a roll over valve of the first embodiment taken along line IV-IV in FIG. 3.
Figure 5:
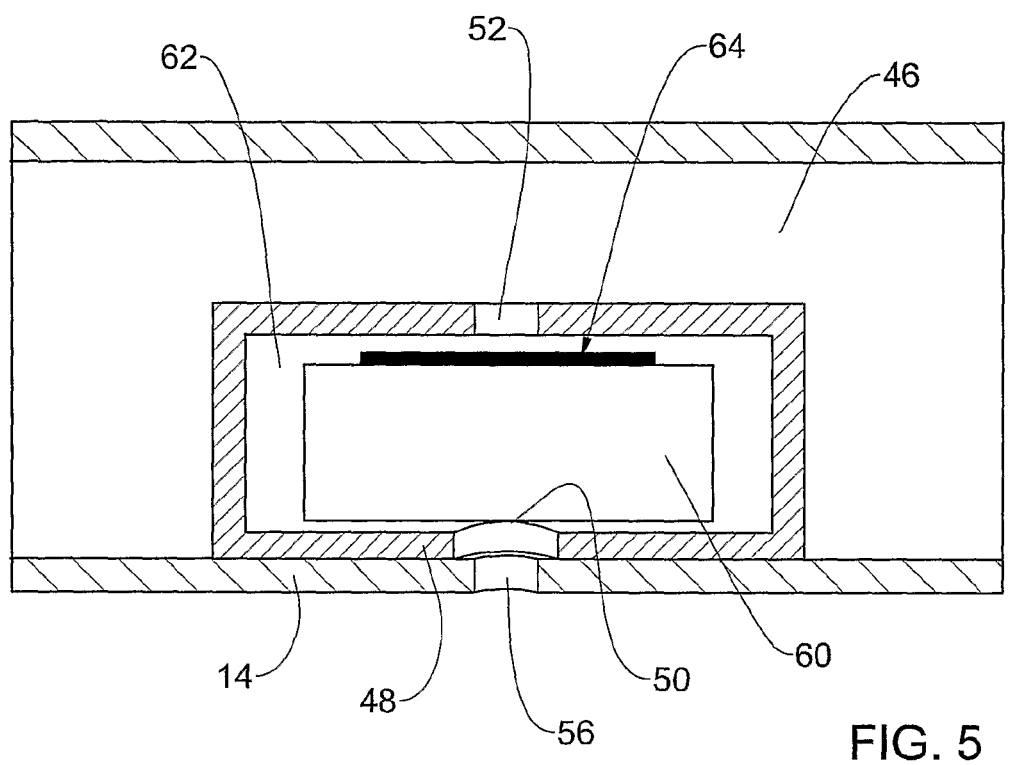
FIG. 5 is an enlargement of a section of an ROV valve marked V in FIG. 3.

Turning now to FIGS. 4 and 5 there is a schematic section taken along line IV-IV in FIG. 3 illustrating a rollover vent valve 30D integrally embedded within the tubing 14. The ROV occupies a portion of the section of the tubing 14, however leaving a significant free flow passage designated at 46 whereby fluid flow is facilitated therethrough, regardless of the position of the respective fuel valve. Accordingly, fuel flow is facilitated through the passage 46 regardless if the fuel vapor accessory (30B in the particular embodiment) is in its open or closed position or even in case of malfunction thereof. The rollover vent 30B comprises an encapsulating body 48 formed with a valve inlet 50 and a valve outlet 52, said inlet 50 extending above an aperture 56 of the tube 14. A float member 60 is received within the body 48 accommodates a float member 60 displaceable within the space 62 of the valve 30B, with a resilient sealing member 64 extending thereabove and fitted for sealing engagement with the outlet 52.

In the embodiment in which the fuel vapor accessory is secured within the tubing, there is a sealing engagement therebetween so as to ensure that fuel vapor passes only through the respective accessory. Accordingly, in the example disclosed hereinabove, the body 48 of the valve is sealingly attached to the tubing 14 such that fluid flow is restricted only through the path extending through aperture 56 and valve inlet 50.

The arrangement is such that at the inadvertent case of rollover of the vehicle or at steep traveling thereof, the float member 60 is displaced against the outlet 52 whereby the sealing member 64 sealingly engages the outlet 52 preventing fuel flow into the flow passage 46. In the event of overfilling of the fuel tank the float member 60 is forced, by buoyancy forces, in an upward direction such that the sealing member 64 sealingly engages the outlet 52 again, preventing liquid flow into the flow passage 46.

Figure 6:
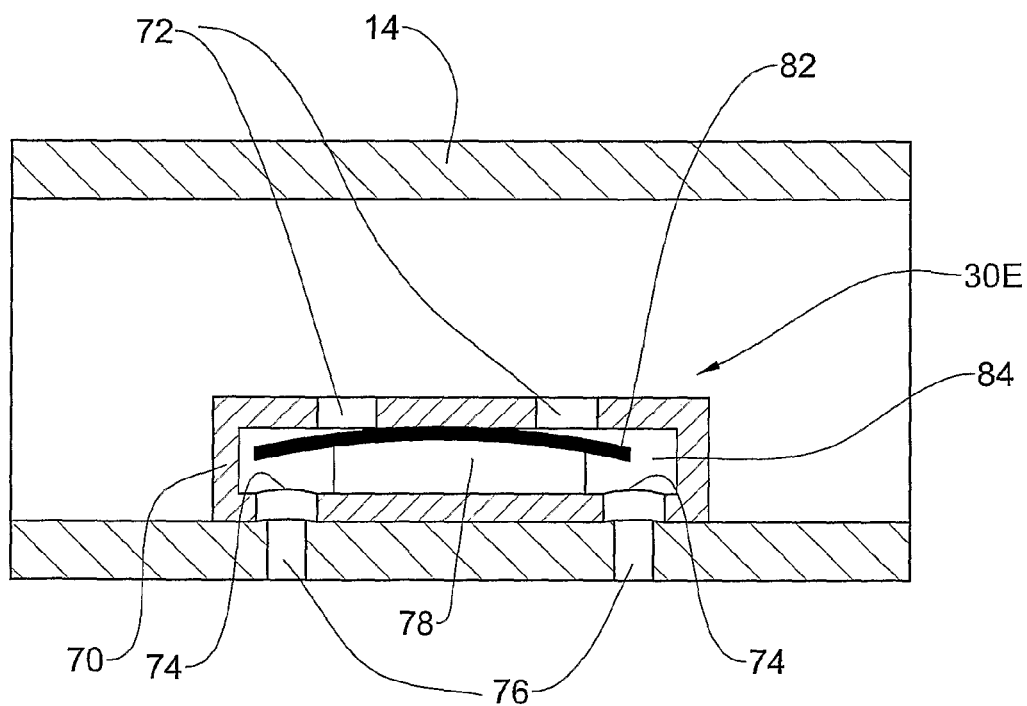
FIG. 6 is an enlargement of a drain valve of the tubing segment marked VI in FIG. 3.

Turning now to FIG. 6 there is illustrated a liquid carryover drain valve 30E comprising a housing 70 integrated into the tubing 14 and extending at a lowermost portion thereof, the housing 70 comprises a plurality of inlet apertures 72 and a plurality of outlet apertures 74 coaxial with apertures 76 formed in the tubing 14. Received within the housing 70 there is a bed 78 supporting a flexible diaphragm 82 extending below the inlet apertures 72 however at a normally disengaged position as illustrated in FIG. 5. The arrangement is such that at the normal course of operation liquid flow in the direction from the tubing 14 into the fuel tank is facilitated through apertures 72, into the chamber 84 of the LCO drain valve and out through apertures 74 and 76 into the fuel tank. However flow in an opposite direction is not facilitated as fluid pressure within the fuel tank will cause deformation of the diaphragm 82 into sealing engagement of the apertures 72. This is important also in case of refueling to ensure pressure build up in the fuel tank for cut-off of a refueling nozzle.

Figure 7:
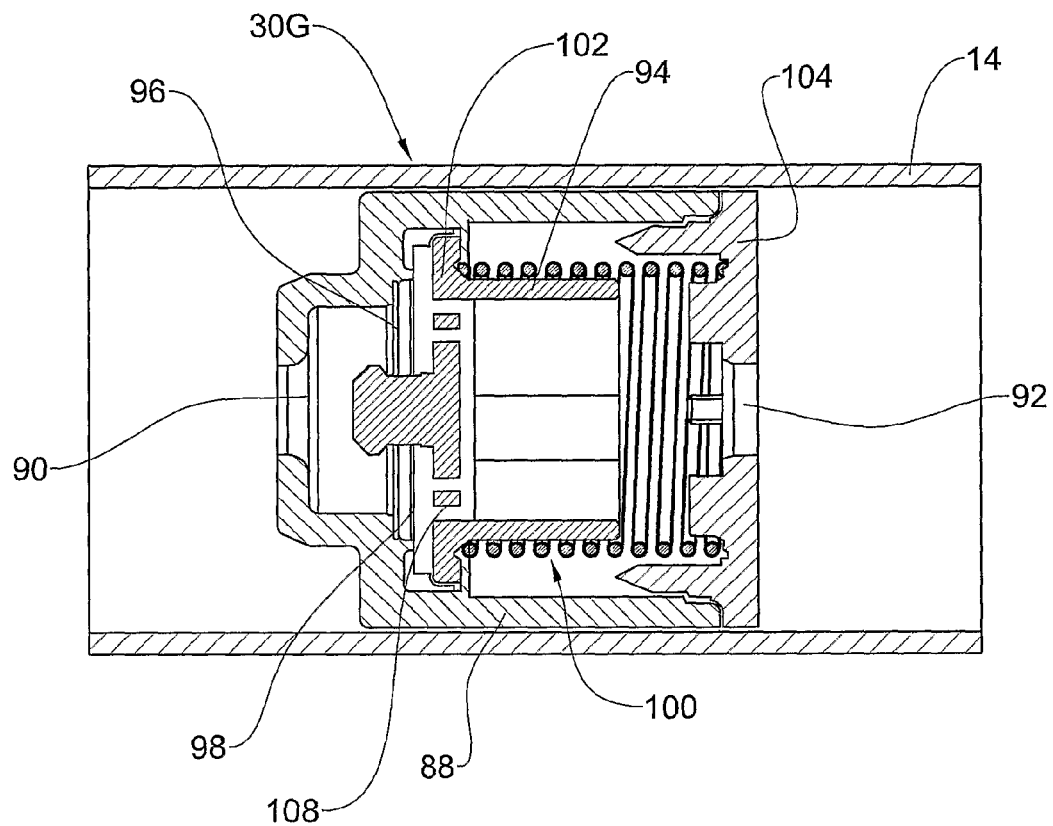
FIG. 7 is an enlargement of the segment marked IV in FIG. 3, illustrating a check valve integrated into the tubing system.

In FIG. 7 there is illustrated a schematic section of a check valve 30G comprising a coaxial housing 88 integrated within the tubing 14 formed with an inlet port 90 and an outward port 92 with a piston 94 axially displaceable therewithin and fitted at its inlet facing and with a sealing member 96 fitted for sealing engagement with a sealing seat 98 formed at the housing 88. The piston 94 is spring biased into sealing engagement, as in the position of FIG. 7, by means of a coiled compression spring 100 bearing at one end against a shoulder 102 of piston 94 and at an opposite end thereof against a packing member 104 fixed to the casing 88. The piston 94 is formed with a plurality of apertures 108 sealing by the sealing member 96 in the direction from the inlet port 90 towards the outlet 92 however which apertures will open under pressure in the event of pressurizing in the direction of outlet port 92 to thereby deform the sealing member 96 to facilitate flow through apertures 108 towards the inlet port 90. However, the apertures 108 remain sealed in flow in the direction from inlet port 90 towards outlet port 92 whereby flow in this direction is facilitated only upon pressure increase overcoming the biasing affect of the coiled spring 100, to facilitate fluid flow at substantially high flow rates.

Figure 8:
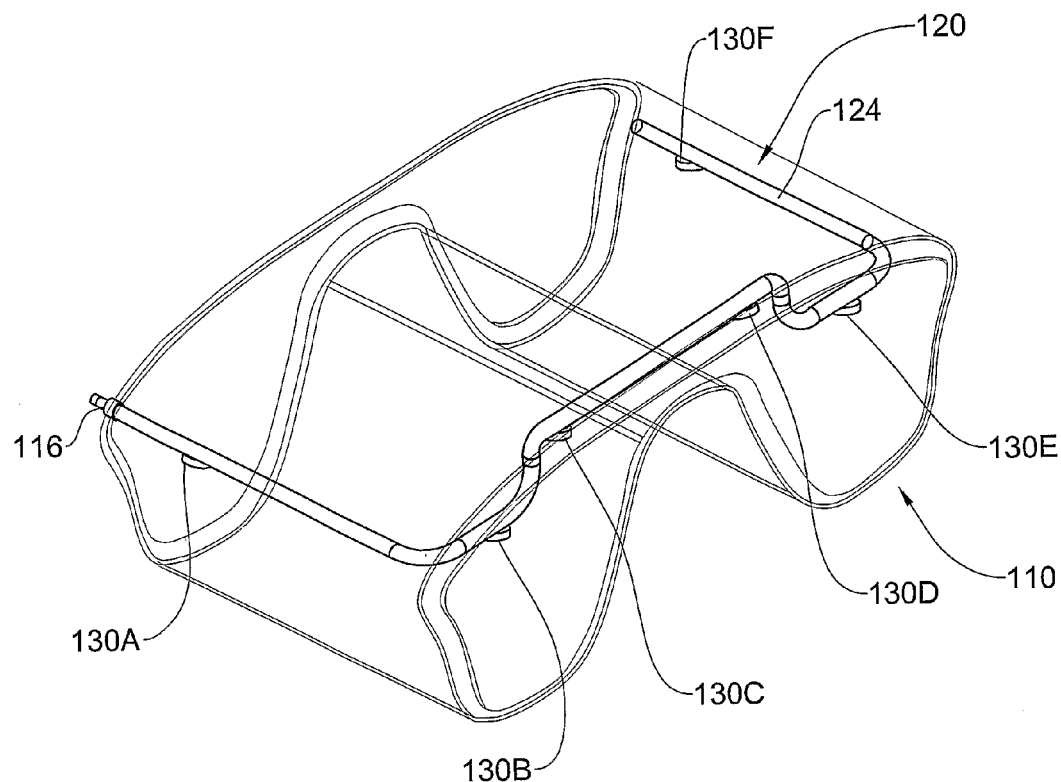
FIG. 8 is an isometric view of a fuel tank fitted with a venting tubing system in accordance with another embodiment of the invention, the fuel tank being made transparent for visualizing the venting system.
Figure 9:
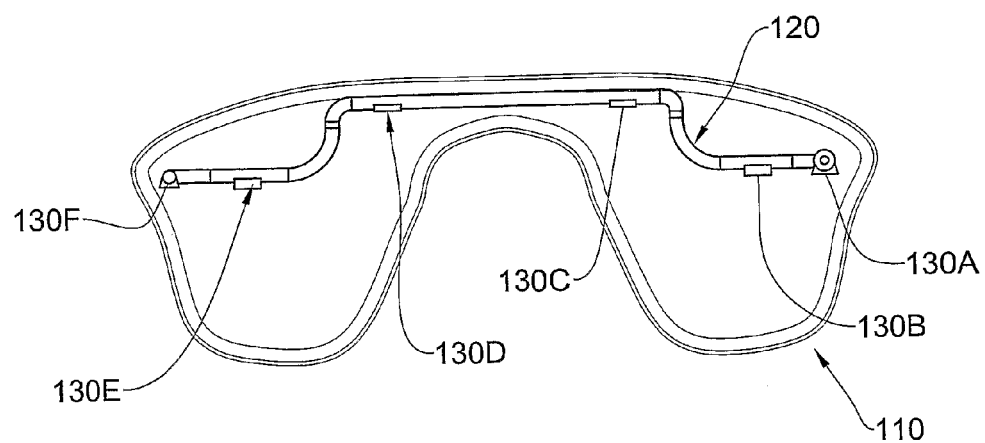
FIG. 9 is a rear view of the fuel tank seen in FIG. 8.
Figure 10:
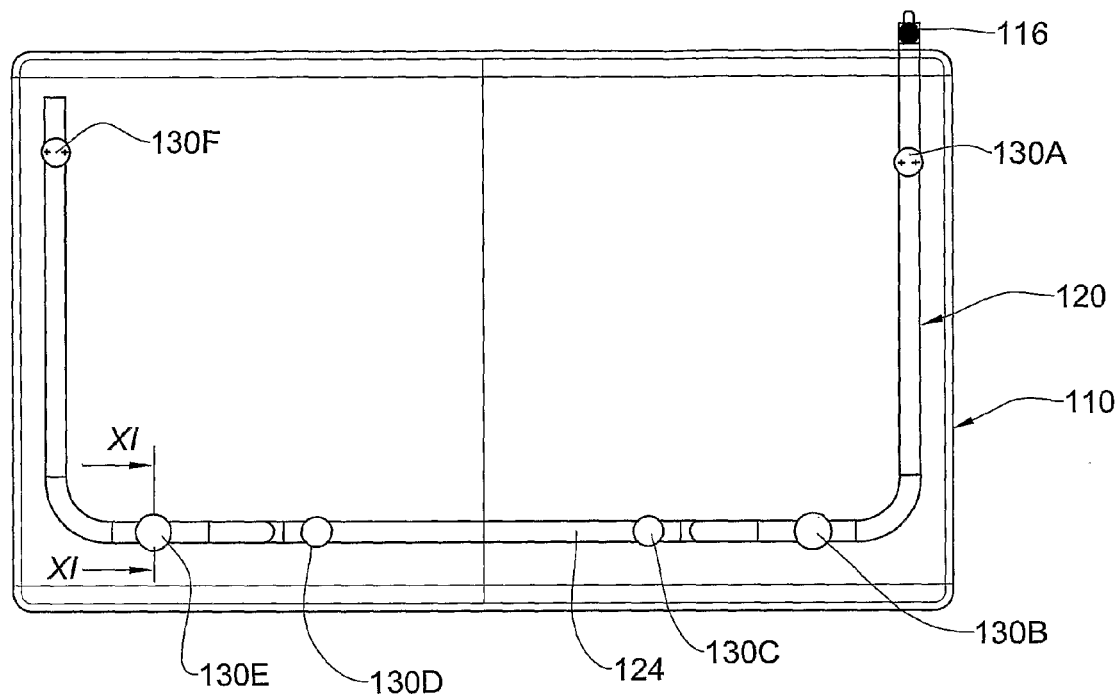
FIG. 10 is a bottom view of the fuel tank seen in FIG. 8.

Turning now to the embodiment of FIGS. 8 to 10 there is illustrated a fuel tank 110, similar to fuel tank 10 of the previous embodiment, however fitted with a venting tubing system in accordance with the somewhat different embodiment generally designated 120.

The tubing system 120 comprises a continuously extending venting tube 124 fitted within the space of the fuel tank 110 in a similar manner as disclosed in connection with the previous embodiment, however with only one outlet formed in the fuel tank, at 116, in a manner which ensures fuel impermeability.

Figure 11:
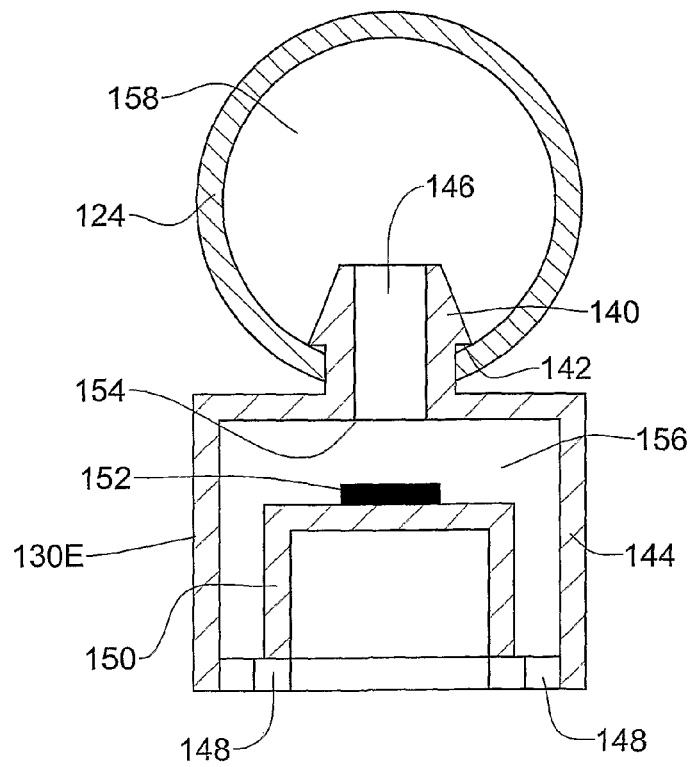
FIG. 11 is a section along line XI-XI in FIG. 10.

Whilst in the previous embodiments, the fuel vapor accessories were enveloped by the tubing 14, in accordance with the present embodiment, the fuel vapor accessories 130A through 130F are external to the tubing 124 and are fixedly secured to the tubing, e.g. in a snap-type connection as illustrated in FIG. 11. This arrangement is suitable for fast and efficient coupling of different fuel vapor accessories, as discussed hereinabove, in a snap-type manner to be distributed within the fuel tank at desired locations.

The rollover vent valve 130E illustrated in FIG. 11 comprises a snap shank portion 140 formed with a shoulder 142 such that when it is snapped into an aperture formed into the tubing 124 it is sealingly arrested thereby preventing its retraction and firmly positioning it. The ROV 130E comprises a housing 144 formed with an outlet 146, one or more inlets 148, a float member 150 supporting a sealing member 152 fitted for sealing engagement with a sealing shoulder 154 of the outlet 146.

The float member 150 is displaceable between an open position, as in FIG. 11, wherein the valve 130E facilitates venting of the fuel tank through inlet ports 148, via space 156 and through outlet 146 into the flow passage 158 of the tubing 124. However, upon filling the fuel tank, liquid level within the tank causes the float member 150 to displace upwardly such that the sealing member 152 engages the sealing shoulder 154 to shut the outlet 146. Similarly, in case of turnover of the vehicle, the float member 150 displaces such that the sealing member 152 sealingly engages the outlet shoulder 154 preventing fuel flow through the outlet 146 into the flow passage 158.

Whilst some particular embodiments have been described and illustrated with reference to some drawings, the artisan will appreciate that many variations are possible which do not depart from the general scope of the invention, mutatis, mutandis. This refers, for example, to the different fuel vapor accessories which may be used and the modifications of the tubing, however with a continues tube as discussed.

The invention claimed is:

1. A fuel tank comprising at least one fuel vapor accessory articulately coupled with a fuel tubing disposed within the fuel tank, the fuel tubing extending from a field end of said tubing towards an outlet end of said tubing and being formed with at least one aperture between said field end and said outlet end for communication with the fuel tank, and said at least one fuel vapor accessory being disposed between said field end and said outlet end, said tubing secured to an inside upper wall of the fuel tank, and said outlet end is coupled to an outlet aperture of the tank.

2. The fuel tank according to claim 1, wherein said at least one fuel vapor accessory is integrated within the tubing.

3. The fuel tank according to claim 1, wherein the tubing is a continuous tube interconnecting at least two fuel vapor accessories within said fuel tank.

4. The fuel tank according to claim 1, wherein the tube envelopes the at least one fuel vapor accessory, with functional openings formed at segments corresponding with said at least one fuel vapor accessory.

5. The fuel tank according to claim 1, wherein the tubing extends between the at least one fuel vapor accessory and a common hub member.

6. The fuel tank according to claim 1, wherein the tubing is pre-formed at a shape corresponding with a contour of the inside upper wall of the fuel tank, to which it is secured.

7. The fuel tank according to claim 1, wherein the tubing is secured to the fuel tank by gripping portions configured for snappingly arresting the tubing.

8. The fuel tank according to claim 1, wherein fluid flow is facilitated through the tubing regardless the operative state of at least one fuel vapor accessory.

9. The fuel tank according to claim 1, wherein the fuel vapor accessory axially extends within the tubing.

10. The fuel tank according to claim 1, wherein said at least one fuel vapor accessory is coupled to the tubing via said at least one aperture.

11. A fuel tubing for a vehicle fuel tank, wherein at least one fuel vapor accessory is articulately coupled to the tubing for being disposed within the fuel tank, said tubing extending from a field end of said tubing towards an outlet end of said tubing and being formed with at least one aperture between said field end and said outlet end for communication with the fuel tank, and adapted for being secured to an inside upper wall of the fuel tank, and said at least one fuel vapor accessory being disposed between said field end and said outlet end, and said outlet end for being coupled to an outlet aperture of the tank.

12. The fuel tubing according to claim 11, wherein said at least one fuel vapor accessory is integrated within the tubing.

13. The fuel tubing according to claim 11, wherein said at least one fuel vapor accessory is snap-coupled to the tubing via said at least one aperture.

14. The fuel tubing according to claim 11, wherein the tubing is a continuous tube for interconnecting at least two fuel vapor accessories within said fuel tank.

15. The fuel tubing according to claim 11, wherein the tube envelopes the at least one fuel vapor accessory, with functional openings formed at segments corresponding with said at least one fuel vapor accessory.

16. The fuel tubing according to claim 11, wherein the tubing extends between the at least one fuel vapor accessory and a common hub member.

17. The fuel tubing according to claim 11, wherein fluid flow is facilitated through the tubing regardless the operative state of at least one fuel vapor accessory.

18. The fuel tubing according to claim 11, wherein the fuel vapor accessory axially extends within the tubing.

\* \* \* \* \*